(No Model.)

J. W. GRUBBS.
TETHER.

No. 396,276. Patented Jan. 15, 1889.

Witnesses:

Inventor:
J. W. Grubbs.
By, Smith & Sheehy
Attorneys.

UNITED STATES PATENT OFFICE.

JOHN W. GRUBBS, OF FAIR PLAY, SOUTH CAROLINA.

TETHER.

SPECIFICATION forming part of Letters Patent No. 396,276, dated January 15, 1889.

Application filed August 2, 1888. Serial No. 281,774. (No model.)

*To all whom it may concern:*

Be it known that I, JOHN WILLIS GRUBBS, a citizen of the United States, residing at Fair Play, in the county of Oconee and State of South Carolina, have invented certain new and useful Improvements in Tethers; and I do declare the following to be a full, clear, and exact description of the invention, such as will enable others skilled in the art to which it appertains to make and use the same.

This invention relates to improvements in tethers for animals; and it consists in an upright post on which is swiveled a pivoted lever provided with a counter-weight and stops for limiting the movement of the said lever.

Figure 1:
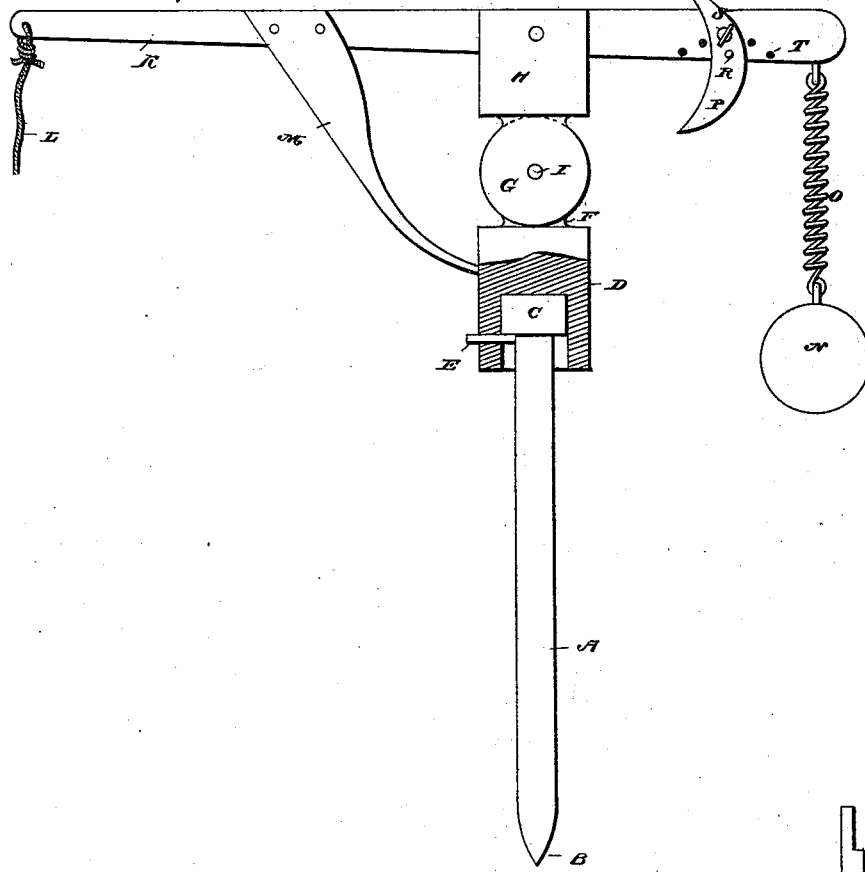
Figure 2:

In the drawings, Figure 1 is an elevation, partially in section, of the improved tether; and Fig. 2, a detail of one of the stops.

Referring to the drawings, the post A is provided with a sharpened point, B, which enters the ground, and a head, C.

Fitting and receiving the head C is a socket-block, D, a pin or set-screw, E, being provided for preventing the block being removed from the post, but permitting it to freely revolve thereon.

On the top of the block D is formed a tongue, F, which is embraced by ears G on a bracket, H, and connected thereto by a pivot-pin, I, to form a pivot or hinge connection between the bracket H and the block D. In the said bracket is secured a lever-arm, K, to one end of which is attached the tether-rope L.

The longer arm of the lever carries a stop-block, M, the free end of which reaches to the block D when the lever is in its lowermost position, as shown in the drawings, and is then recessed to fit the shape of the said block. This stop limits the downward movement of the lever. The other and shorter end of the lever carries a weight, N, connected to the said lever by a spring, O, to prevent sudden jars or shocks, and also carries a curved stop, P, adjustable around the center R, and held by a screw or pin, S, which enters holes T in the said lever. This stop also has its end of a shape to conform to that of the block D, and can be moved on its pivot nearer to or farther from the lever to regulate the approach of the said lever to the perpendicular.

It will be seen that the post may be readily driven into the ground, the block and lever adjusted, and the animal fastened, and that then the animal may graze up to the post and from there to the end of the tether.

Having described my invention, what I claim is—

A tether for animals, consisting of the post, the block swiveled thereto, the lever pivoted to the block, the stop M on one side of the pivot-point, the weight N on the other side of the said point, and the adjustable stop P between the said pivot and weight, substantially as specified.

In testimony whereof I affix my signature in presence of two witnesses.

J. W. GRUBBS.

Witnesses:
E. K. PEPPER,
W. H. LAND.